(12) United States Patent
Patil et al.

(10) Patent No.: US 7,710,964 B2
(45) Date of Patent: May 4, 2010

(54) DISCOVERING A NETWORK ELEMENT IN A COMMUNICATION SYSTEM

(75) Inventors: Basavaraj Patil, Coppell, TX (US); Vijay Devarapalli, Santa Clara, CA (US)

(73) Assignee: Nokia Corporation, Espoo (FI)

( * ) Notice: Subject to any disclaimer, the term of this patent is extended or adjusted under 35 U.S.C. 154(b) by 1537 days.

(21) Appl. No.: 10/921,849

(22) Filed: Aug. 20, 2004

(65) Prior Publication Data

US 2006/0015590 A1 Jan. 19, 2006

(51) Int. Cl.
*H04L 12/28* (2006.01)

(52) U.S. Cl. ...................................... 370/392; 370/401

(58) Field of Classification Search ................ 370/328, 370/389, 392, 400, 401, 469
See application file for complete search history.

(56) References Cited

U.S. PATENT DOCUMENTS

| 6,785,256 | B2 * | 8/2004 | O'Neill ...................... 370/338 |
| 6,970,452 | B2 * | 11/2005 | Kim et al. .................... 370/352 |
| 7,193,985 | B1 * | 3/2007 | Lewis et al. ................. 370/338 |
| 7,245,622 | B2 * | 7/2007 | Huitema ...................... 370/392 |
| 7,436,843 | B2 * | 10/2008 | Gustafsson et al. .......... 370/401 |

FOREIGN PATENT DOCUMENTS

WO    WO 02/082207    10/2002

OTHER PUBLICATIONS

3GPP TS 23.221, "3rd Generation Partnership Project, Technical Specification Group Services and System Aspects; Architectural requirements (Release 4)", V4.2.0, Jun. 2002.*
Philippe Bereski et al.—Alcatel; Gilles Diribarne—Udcast, "Dual Stack deployment using DSTM and neighbour discovery", Feb. 2002, pp. 1-12.
Tim Chown—University of Southampton; "D2.3.1: IPv4 to IPv6 scoping report for end site networks/universities" XP-002345877, Jul. 31, 2002, pp. 1-45.
Y. Rekhter et al. "Address Allocation for Private Internets"; Network Working Group; Feb. 1996; pp. 1-9.

* cited by examiner

*Primary Examiner*—Dang T Ton
*Assistant Examiner*—Brian O'Connor
(74) *Attorney, Agent, or Firm*—Mintz, Levin, Cohn, Ferris, Glovsky and Popeo, P.C.

(57) ABSTRACT

A method, terminal, backend network entity, and system for discovering a network element in a communication system for a terminal, wherein the terminal is establishing a connection to a first part of the communication system, the discovering of the network element comprising a step of retrieving a network address of the network element from a backend network entity of the communication system, wherein the step of retrieving constitutes a part of an authentication of the terminal at the first part of the communication system by means of the backend network entity. Further, the retrieving can be based on a subscription profile of the terminal and/or a database at the backend network entity.

39 Claims, 4 Drawing Sheets

DISCOVERING A NETWORK ELEMENT IN A COMMUNICATION SYSTEM

FIELD OF THE INVENTION

The present invention relates to a method, terminal, network entity and system for discovering a network element in a communication system. In particular, the present invention relates to the discovering of an interworking network element in mobile communication networks such as cdma2000 networks, for example.

BACKGROUND OF THE INVENTION

In recent years, communication technology has widely spread in terms of the number of users and amount of use of the telecommunication services by the users. This also led to an increase in the number of different technologies and technological concepts in use. In particular, two main areas of communication experienced overly large increases in the past years.

One of these areas is mobile communications and mobile communication networks. In this connection, the evolution from Second Generation (2G) mobile communication systems towards Third Generation (3G) mobile communication systems is particularly worth mentioning. Among others, this includes the development of systems such as the General Packet Radio Service (GPRS), the Universal Mobile Telecommunications System (UMTS) and cdma2000 as an example of a system being based on a code division multiple access (CDMA) radio technology. The term cdma2000 is to be understood to represent a family of standards describing the use of CDMA in a way to meet the requirements of 3G communication systems as defined in IMT-2000, for example.

The other area comprises Internet communications, which includes communications being based on the Internet Protocol (IP) as a communication protocol used and/or being accomplished in networks being based on the Internet Protocol. Thereby, the Internet Protocol being specified by the Internet Engineering Task Force (IETF) proved to be seminal, especially in wired and fixed-line communications. In this regard, IP is mentioned only as an example of packet-based communication protocols, and of course others are also conceivable.

Further, there can be observed a trend in merging of different technologies and technological concepts, which have been previously used separately. For example, IP is one of the proposed and favored communication protocols for future mobile communication systems.

Thus, two of the main areas of communication, i.e. mobile communications and Internet communications, are about to grow together. Therewith, new chances and prospects arise for future services. However, since the single technologies in both areas are not designed to comply with each other for a seamless cooperation, a multitude of problems and requirements will also arise.

The Internet Protocol deployed globally today is primarily Internet Protocol version 4 (IPv4). In IPv4, the address space of available network addresses for the participating communication entities is relatively limited. In more detail, since the IP address field of IP version 4 has a length of 32 bits, there exist $2^{32}$ available IP addresses. With the above-mentioned rapid growth and expansion of the Internet and the number of hosts connected to the Internet, the addresses available in IPv4 have been depleted significantly, i.e. by more than 50%.

Additionally, an increasing interconnection of previously not interconnected devices of all kinds can be expected for the near future. For example, sensor networks consisting of hundreds of sensor devices are expected to be built up. In this connection, one vision resides in that all electronic devices will sometime be interconnected with each other worldwide. For the communication between these devices, IP is the favorite choice of communication protocol. With such prospects, the shortage of IP addresses will become even more urgent within the next few years.

In order to overcome the problem of the current address space running out, a new version of the Internet Protocol called Internet Protocol version 6 (IPv6) has been standardized in the IETF. In IPv6, the address space of available network addresses for the participating communication entities is much larger. In more detail, since the IP address field of IP version 6 has a length of 128 bits, there exist $2^{128}$ available IP addresses. Furthermore, IPv6 has advantages in e.g. autoconfiguration, mobile IP applications and automatic renumbering.

The limited availability of IPv4 addresses and the increasing growth of IP capable mobile devices makes the problem of assigning globally routable IPv4 addresses challenging if not impossible. The only solution today is to assign private IP addresses which are defined in RFC1918. Hence, Network Address Translators (NATs) would have to be used for mapping private and public IP addresses with each other in order to overcome the shortage problems. However, this brings in a multitude of problems. While it is possible to overcome the issues that NATs present, it does require additional equipment, modifications to applications, gateways etc. To the contrary, as mentioned above, IPv6 does not have the address shortage problem that IPv4 presents and hence is the more favorable approach as a long-term solution.

An end-to-end IPv6 connectivity enables a deployment of services based on the Session Initiation Protocol (SIP) as well as peer-to-peer applications in a much easier manner since issues associated with Network Address Translators (NATs) would not have to be dealt with. This is why the present application emphasizes the focus on the usage of IPv6. However, other protocols may still comply with the idea as conceived with the present invention. That is, the present invention is not limited to be applied to IPv6.

For transition from the current IPv4-based networks and hosts to such based on IPv6 there are a number of mechanisms and means to be introduced, some of which have already been developed. Further, it is unavoidable that both protocols are being used in parallel for some time. In the following, an example scenario for problems occurring by a simultaneous usage of Internet Protocol applications of different versions will be outlined.

In the Third Generation Partnership Projects 3GPP and 3GPP2, there is specified a so-called IP Multimedia Subsystem (IMS). The IMS essentially creates a SIP infrastructure for packet networks such as GPRS/UMTS and cdma2000. The IMS enables the creation and deployment of various types of applications and services that use SIP. These applications can be realtime, non-realtime, multimedia and others. The IMS is the service core of the 3G packet networks. Therewith, operators of Public Land Mobile Networks (PLMNs) such as UMTS or cdma2000 can offer their subscribers services based on and built upon packet data networks that are primarily based on IP. IMS deployments are expected to occur in the near future. This implies that terminals will need to connect and communicate with the IMS network elements via IPv6 protocols.

However, mobile communication systems such as cdma2000 networks that are currently deployed in many countries primarily (or even exclusively) support IPv4 as well as IPv6 as the communication protocol. Terminals such as mobile stations will be dual-stack (DS) capable, i.e. they will have both an IPv4 protocol stack and an IPv6 protocol stack built in for being able to communicate via IPv4 and IPv6. As a result it is possible that the access network to which the terminal connects can be based on IPv4 only. However, it is still possible to establish an IPv6 session with an IPv6-based IMS. This would be enabled by encapsulating (tunneling) IPv6 packets as IPv4 payload in IPv4 packets, transmitting these IPv4 packets through the access network, and subsequently decapsulating the IPv6 packets out of the IPv4 packets at a DS router in the network.

In order to enable this, a dual-stack router is needed, which supports both IPv4 and IPv6 and is capable of encapsulation and decapsulation of IPv6 packets. Such a dual-stack router can be arranged somewhere in the core network and may not necessarily be "visible" to the access network and, thus, to a terminal being connected to the access network. In many instances the dual-stack router may be in the home network of the operator and the visited or foreign network even may not have any such router.

The terminal needs to be aware of a dual-stack (DS) router in the network, which dual-stack router is capable of encapsulation and decapsulation of IPv6 packets transmitted to and from the terminal. Thus, the host or terminal needs to discover the network address of this dual stack router in order to use IPv6 via encapsulation over an IPv4 network such as a conventional radio access network.

In prior art, the discovery of a dual-stack router has already been addressed previously, e.g. by the IETF.

Current solutions involve the use of multicast or configuring of the dual-stack (DS) router with an anycast address. Solutions based on Domain Name System (DNS) and Dynamic Host Configuration Protocol (DHCP) are also found to be possible.

However, a mobile communication network, e.g. the cdma2000 packet data network, presents a different architecture as compared to standard IP networks. Since the hosts are connected over an air interface that is operated in the licensed bandwidth spectrum, it is critical that discovery and configuration of such servers is done as optimally as possible e.g. as regards bandwidth efficiency. Yet, the proposed solutions can not fulfill these requirements and, therefore, are unfavorable in this connection.

It is also possible that a preconfigured address of the dual-stack router can be used. However this does not provide an optimal solution since the operator would have to deploy a certain number of dual-stack routers based on the number of subscribers rather than the number of active users at any given time. Also a load-balancing and an optimal location of the router cannot be achieved this way.

Solutions to the problem of discovering a dual-stack router, e.g. a DS IPv4/v6 transition router, have also been presented in the IETF, However, without a focus on the special requirements and needs of mobile communication systems.

SUMMARY OF THE INVENTION

Consequently, it is an objective of the present invention to remove the above drawbacks inherent to the prior art and to provide an accordingly improved method, terminal, network entity and system.

According to a first aspect of the invention, this objective is for example achieved by a method of discovering a network element in a communication system for a terminal, wherein the terminal is establishing a connection to a first part of the communication system, the discovering of the network element comprising a step of retrieving a network address of the network element from a backend network entity of the communication system, wherein the step of retrieving constitutes a part of an authentication of the terminal at the first part of the communication system by means of the backend network entity.

According to further advantageous developments:

the step of retrieving a network address is based on a subscription profile of the terminal;

the step of retrieving a network address is based on a database at the backend network entity, which database comprises network addresses of network elements of the communication system;

the method further comprises a step of establishing a connection between the terminal and the network element by means of the retrieved network address of the network element;

the method further comprises a step of providing a gateway functionality between the first and a second part of the communication system by the network element to be discovered;

the step of retrieving further comprises the steps of sending a request from the terminal to a service node in the first part of the communication system; forwarding of the request from the service node to the backend network entity; and obtaining the network address of the network element at the backend network entity, wherein the request comprises a request for authentication of the terminal at a second part of the communication system and credentials of the terminal;

the step of obtaining the network address of the network element comprises the steps of checking the request at the backend network entity by verifying the credentials of the terminal with a subscription profile of the terminal; if authentication for the second part of the communication system is approved, reading the network address of the network element from a database; including the read network address in a response message for the service node;

the step of retrieving further comprises the steps of forwarding the obtained network address from the backend network entity to the service node; sending a response from the service node to, the terminal, wherein the response comprises the obtained network address of the network element;

the step of retrieving comprises a step of selecting, at the backend network entity, one of a plurality of network elements as the network element, whose network address is to be retrieved, based on predetermined selection criteria;

the step of retrieving of the network address forms a part of a setup procedure according to a Point-to-Point-Protocol; and the network address to be retrieved is the Internet Protocol address of the network element.

According to a second aspect of the invention, the object is for example achieved by a terminal configured for discovering a network element in a communication system, wherein the terminal is connectable to a first part of the communication system, the terminal comprising retrieving means configured for retrieving a network address of the network element from a backend network entity of the communication system.

According to further advantageous developments:

the retrieving means are configured to perform the retrieving based on a subscription profile of the terminal;

the retrieving means are configured to perform the retrieving based on a database at the backend network entity, which database comprises network addresses of network elements of the communication system;

the retrieving means are configured to perform the retrieving in accordance with authenticating means configured for authenticating of the terminal at the first part of the communications system by means of the backend network entity;

the terminal further comprises connection means configured for establishing a connection between the terminal and the network element by means of the retrieved network address of the network element;

the terminal further comprises transceiver means configured for sending a request from the terminal to a service node in the first part of the communication system, and for receiving a response message from the service node, wherein the request comprises a request for authentication of the terminal at a second part of the communication system and credentials of the terminal;

the retrieving means are configured to perform the retrieving of the network address as a part of a setup procedure according to a Point-to-Point-Protocol; and the terminal is configured to be operable in accordance with at least one communication protocol.

According to a third aspect of the invention, the objective is for example achieved by a backend network entity configured for discovering a network element in a communication system for a terminal, wherein the terminal is connectable to a first part of the communication system, the backend network entity comprising obtaining means configured for obtaining a network address of the network element.

According to further advantageous developments:

the obtaining means are configured to perform the obtaining based on a subscription profile of the terminal;

the obtaining means are configured to perform the obtaining based on a database at the backend network entity, which database comprises network addresses of network elements of the communication system;

the obtaining means further comprise checking means configured for checking a request from the terminal by verifying the credentials of the terminal with a subscription profile of the terminal, wherein the request comprises a request for authentication of the terminal at a second part of the communications system and credentials of the terminal; reading means configured for reading the network address of the network element from a database, if authentication for the second part of the communication system is approved; including means configured for including the read network address in a response message for the terminal;

the backend network entity further comprises transceiver means configured for receiving a request from the terminal or an intermediate service node and for forwarding the obtained network address to the terminal or to an intermediate service node, wherein the request comprises a request for authentication of the terminal at a second part of the communications system and credentials of the terminal;

the backend network entity further comprises selection means configured for selecting one of a plurality of network elements as the network element, whose network address is to be obtained, based on predetermined selection criteria;

the obtaining means are configured to perform the obtaining of the network address as a portion of a setup procedure of the terminal according to a Point-to-Point-Protocol;

the backend network entity comprise an AAA server configured for performing authentication, authorization and accounting functionality; and the backend network entity are configured to be operable according to the Remote Access Dial-In User Service protocol.

According to a fourth aspect of the invention, the object is for example achieved by a system configured for discovering a network element in a communication system for a terminal, wherein the terminal is connectable to a first part of the communication system, the discovering of the network element comprising a retrieving of a network address of the network element from a backend network entity of the communication system, the system comprising at least one terminal according to the present invention; and at least one backend network entity according the present invention.

According to further advantageous developments:

the system is configured to be operable according to the method according to the present invention;

the communication system is based on the cdma2000 standard;

the first part of the communication system comprises an access network;

the communication system further comprises a second part;

the network element provides a gateway from the first part to the second part of the communication system;

the second part of the communication system comprises a multimedia subsystem based on the Internet protocol;

the first part and the second part of the communication system are operable in accordance with different communication protocols, and wherein the network element is configured to perform a conversion between the communication protocols of the individual parts;

the communication protocol of the first part comprises Internet Protocol version 4;

the communication protocol of the second part comprises Internet Protocol version 6;

the network element comprises an IPv4/v6 interworking router; and the terminal is configured to be operable in accordance with both communication protocols.

It is an advantage of the present invention that a discovery of a dual-stack (IPv4/v6) router and its globally routable network address for a terminal is provided.

It is a further advantage of the present invention that a terminal is enabled to communicate with an IP Multimedia Subsystem based on IPv6 in IPv6 native mode, although the terminal is connected via an access network based on IPv4.

With the embodiments of the present invention, the advantages of the present invention are specifically provided for cdma2000 packet data networks being specified by 3GPP2.

It is another advantage of the present invention that the discovery of the dual-stack router is incorporated into an existing AAA signaling, thus without the need for extra steps and/or additional signaling.

It is a further advantage of the embodiments of the present invention that the implementation of the solution of the present invention requires minimal changes in the core network and the terminal.

It is a further advantage of the embodiments of the present invention that the DS router can be picked from a plurality of suited DS routers according to predetermined selection criteria.

The advantages mentioned above are exemplary advantages of one or more embodiments. It is to be understood that not each embodiment necessarily shows all advantages simultaneously.

BRIEF DESCRIPTION OF THE DRAWINGS

In the following, the present invention will be described in greater detail with reference to the accompanying drawings, in which.

DETAILED DESCRIPTION OF EMBODIMENTS OF THE PRESENT INVENTION

It is to be noted that the present invention will be described in the following by way of example with a focus to a communication system comprising a cdma2000 mobile communication network and an IP Multimedia Subsystem. However, the present invention is not restricted to such a network structure. Rather, the present invention is applicable to all communication networks, in particular to those consisting of two parts which are connected via a network element such as an interworking router.

Figure 1:
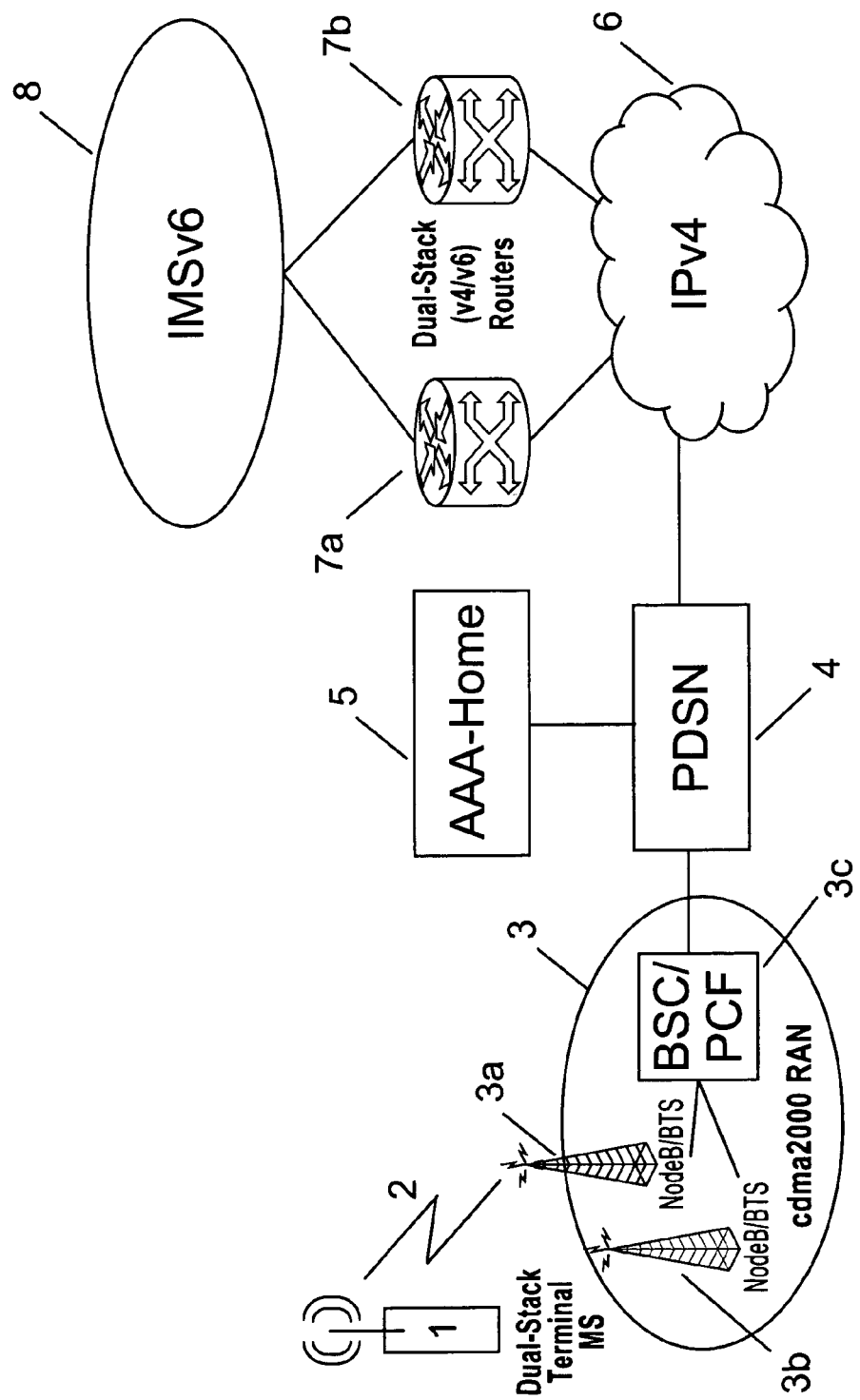
FIG. 1 depicts a network topology according to an embodiment of the present invention.

FIG. 1 depicts a network topology according to an embodiment of the present invention.

A dual-stack terminal 1 is shown with a radio connection 2 to a radio access network 3 according to the cdma2000 standard, i.e. a cdma2000 RAN. The shown radio connection 2 is to be understood such that the terminal is connectable to the radio access network 3 and is establishing such a connection at this moment. The responsible network node 3a, 3b in the radio access network is alternatively called a Node_B, a Base Transceiver Station BTS or Access Point AP. The functions of these are well known and specified e.g. in the cdma2000 standard. A plurality of such network nodes, of which two are shown by way of example, are connected to further network nodes being represented by a block 3c labeled BSC/PCF. This block represents a Base Station Controller BSC and a Policy Control Function PCF, both of these being part of the standardized cdma2000 network. Although these nodes are shown in a common block, they can also be implemented separately and/or at different locations. Since the functions and operating procedures of the radio access network are not essential for the understanding of the present invention, their description will not be further detailed here.

Connected to the radio access network, there is shown a Packet Data Serving Node 4 PDSN, which has further connections to an Authentication, Authorization, and Accounting (AAA) home server 5 referred to as AAA-Home and an IPv4-based network 6, which is not specified in more detail and thus can be any IPv4-based network, represented by a cloud labeled IPv4. The AAA home server 5 is depicted to have only one connection to the PDSN 4, but it may also have another connection (not shown) to the IPv4-based network 6. AAA-Home 5 represents a backend infrastructure of the communication system, which comprises at least one backend network entity and is configured for performing authentication, authorization and accounting functions for the present communication system. For this purpose at least one backend network entity of the backend infrastructure AAA-Home is operated according to any existing protocol being adapted to AAA functionality, e.g. the Remote Access Dial-In User Service (RADIUS) protocol, or Diameter, or any other protocol accomplishing the same tasks.

The collectivity of the cdma2000 RAN 3, the PDSN 4, the AAA-Home 5 and the IPv4 network 6 can in general words be summarized as a first part of the present communication system. According to the present example, the entire first part of the system is operated using IPv4. The dual-stack terminal 1 is connecting to this first part of the communication system.

A second part of the communication system is represented by IMSv6 8 which is intended to illustrate an IP Multimedia Subsystem according to 3GPP2 specifications mentioned above. The IMS and, thus, the second part of the present communication system of this example is operated according to the Internet Protocol version 6.

In FIG. 1, the two parts of the communication system are connected by two parallel interworking routers 7a, 7b both providing a gateway between the two parts. Accordingly, the first part and the second part of the communication system are operated in accordance with different communication protocols and the network elements in-between are configured to perform a conversion between the communication protocols of the individual parts. In the present example, the different communication protocols are IPv4 and IPv6, and the network elements connecting the parts are IPv4/IPv6 interworking routers (also called dual-stack routers), for example.

The terminal 1 wants to establish a connection to the IP Multimedia Subsystem IMSv6 8 in IPv6 native mode ; i.e. by directly using IPv6 as the communication protocol on layer 3 of the ISO/OSI (International Standards Organization/Open Systems Interconnect) layer model. In order to be able to do so, the terminal 1 needs to discover a network element 7a, 7b providing a gateway between the first part of the communication system, to which the terminal has a connection, and the second part of the communication system, i.e. the IMSv6. In other words, the terminal needs to know the network address, e.g. the IP address, of the gateway network element.

For streamlining the following description, the solution according to the present invention will be explained with reference to FIG. 1 and FIG. 2 in parallel. Thereby, FIG. 1 depicts a system according to the present invention and FIG. 2 depicts a signaling flow of a method according to the present invention.

Note that specific messages and signaling are mentioned only as an example, and that in case other protocols are used for a specific purpose, the message/signaling names may be different, while however the same functionality is achieved.

In cdma2000 networks, the mobile station 1 has to authenticate to the access network 3, i.e. the cdma2000 RAN, before it has an authorized access to send and receive IP packets. In the case of a simple IP service, authentication is done as part of the negotiation between the mobile station and the PDSN (see FIG. 1) according to the Point-to-Point-Protocol PPP. In the case of Mobile IPv4, authentication is performed via a Registration Request message originated by the mobile terminal.

Figure 2:
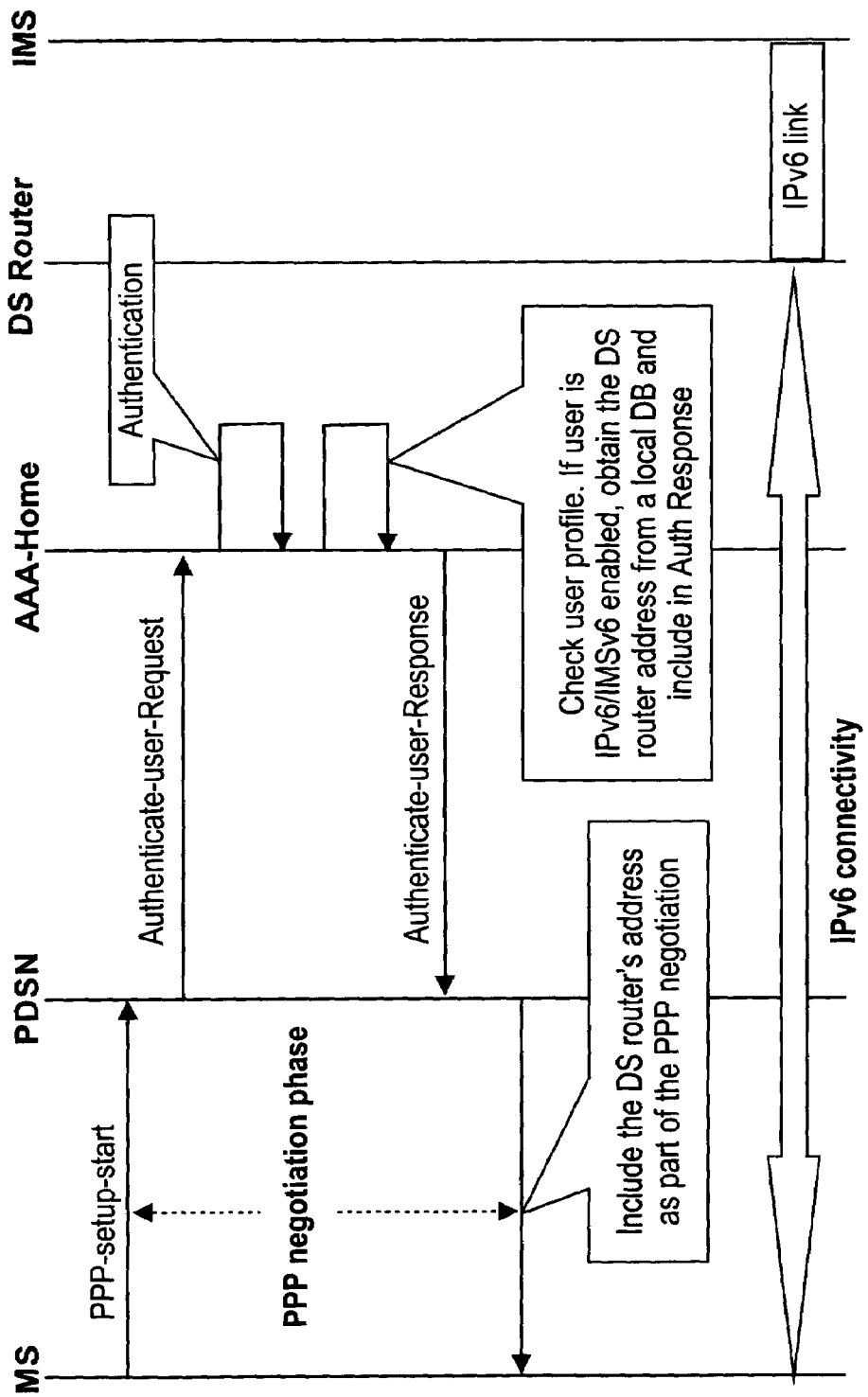
FIG. 2 depicts a signaling flow of a method according to an embodiment of the present invention.

According to FIG. 2, the sending of a request from the terminal MS to the service node PDSN is exemplarily depicted by a message "PPP-setup-start" logically belonging to the PPP negotiation phase of the terminal and the service node PDSN. This request message comprises a request for authentication of the terminal at the IMSv6, i.e. at the second part of the communication system, and credentials (e.g. password etc.) of the terminal.

In all cases authentication involves the access network relying on an AAA backend infrastructure to verify the credentials of the mobile. In FIG. 1, the AAA backend infrastructure is represented by the AAA home server.

According to FIG. 2, the request message is forwarded from the service node PDSN to the AAA backend infrastructure represented by the backend network entity AAA-Home by means of a message "Authenticate-user-Request". At the AAA backend network entity, besides performing an authentication of the requesting terminal (see label "Authentication" in FIG. 2), the network address of the dual-stack router is obtained.

Since the AAA server in the home network holds the user's (or the terminal's) subscription profile and is also responsible for authenticating the user (or the terminal), it is possible that the subscription profile will include additional data. The additional data indicates that the user is IMS enabled (subscribed for IMS services), i.e. authorized for accessing the second part of the communication system. As a result, it is possible to include the network address of the dual-stack router in a response message "Authenticate-user-Response". In this response, the obtained network address is forwarded from the AAA server to the service node PDSN, and from there the address is sent to the terminal MS as part of the PPP negotiation (possibly in an extension to PPP that is vendor-specific or 3GPP2-specific).

As a result, the mobile station or terminal will be aware of the tunnel-end-point address of the dual-stack router and use it for establishing a connection between itself and the network element by means of the discovered network address, and thus for forwarding IPv6 packets encapsulated in an IPv4 header. The destination address of the outer IPv4 packet from the terminal MS (i.e. the IPv4 header) is the network address of the dual-stack router that was obtained from the AAA server during PPP setup. This is illustrated in FIG. 2 by a double-headed arrow labeled IPv6 connectivity.

Since the DS router is connected to the same IPv6 network as the IMS is, a communication between the terminal and the IP Multimedia Subsystem is enabled with the above procedure.

The home network is the one that is aware of the need for the respective configuration by a terminal. Hence, the information is available in the subscriber profile and is used to determine to which terminal the information is provided.

According to the present solution, the actual process of obtaining the network address of the network element in question is as follows.

First, the incoming request from the terminal is checked at the AAA backend network entity by verifying the credentials (e.g. password) of the terminal with the subscription profile of the terminal. If authentication for the second part of the communication system is approved, i.e. if the user is IPv6/IMSv6 enabled, the network address of the interworking network element is read from a network address database of the AAA backend network entity. After that, the read network address is included in a respective message for the terminal as is described above.

Stated in other words, the solution of the present invention comprises a method of discovering a network element in a communication system for a terminal, wherein the terminal is establishing a connection to a first part of the communication system. The process of discovering the network element comprises a step of retrieving a network address of the network element from a backend network entity of the communication system. This step of retrieving constitutes a part of an authentication of the terminal at the first part of the communication system by means of the backend network entity.

It is a facet of the present invention that the retrieving of the network address is based on a subscription profile of the terminal and/or a database at the backend network entity, which database comprises network addresses of network elements of the communication system. According to another facet, the method according to the present invention comprises a step of providing a gateway functionality between a first and a second part of the communication system by the network element to be discovered.

It is an advantage of the present invention that the implementation of the solution is quite straightforward and only requires minimal changes in the core network and the terminals.

The AAA home server has a database of all the possible dual-stack routers that are available for connecting to the IMSv6 system. The subscriber profile in the home AAA server is enhanced to indicate that the user requires the address of a (suitable) dual-stack router. Additionally, the AAA signaling messages is enhanced with a new attribute-value-pair (AVP) that includes the address of the dual-stack router in the message "Authentication-user-Response" sent to the PDSN. The PDSN and the terminals also implement support for carrying the address of the dual-stack router as part of the PPP negotiations. This is implemented as a PPP extension, for example.

It is to be understood that there may be more than one interworking network element connecting the two parts of the communication system. Such a situation is already depicted in FIG. 1 since two dual-stack routers are shown. Thus, either the terminal chooses one of the possible routers itself or it leaves the choice to the AAA backend network entity processing its request. Then, the AAA server, i.e. the backend network entity, selects one of the plurality of possible network elements as the network element whose network address is to be obtained. In order to optimize the choice, the dual-stack router chosen by the AAA server to serve a terminal is selected based on predetermined selection criteria, for example load conditions, optimal location, proximity to the MS or the PDSN that the mobile is connecting from, or other parameters, whether individually or combined. With the proximity criterion, it is for example possible to optimize (i.e. minimize) the number of hops between the terminal and the dual-stack router.

Figure 3:
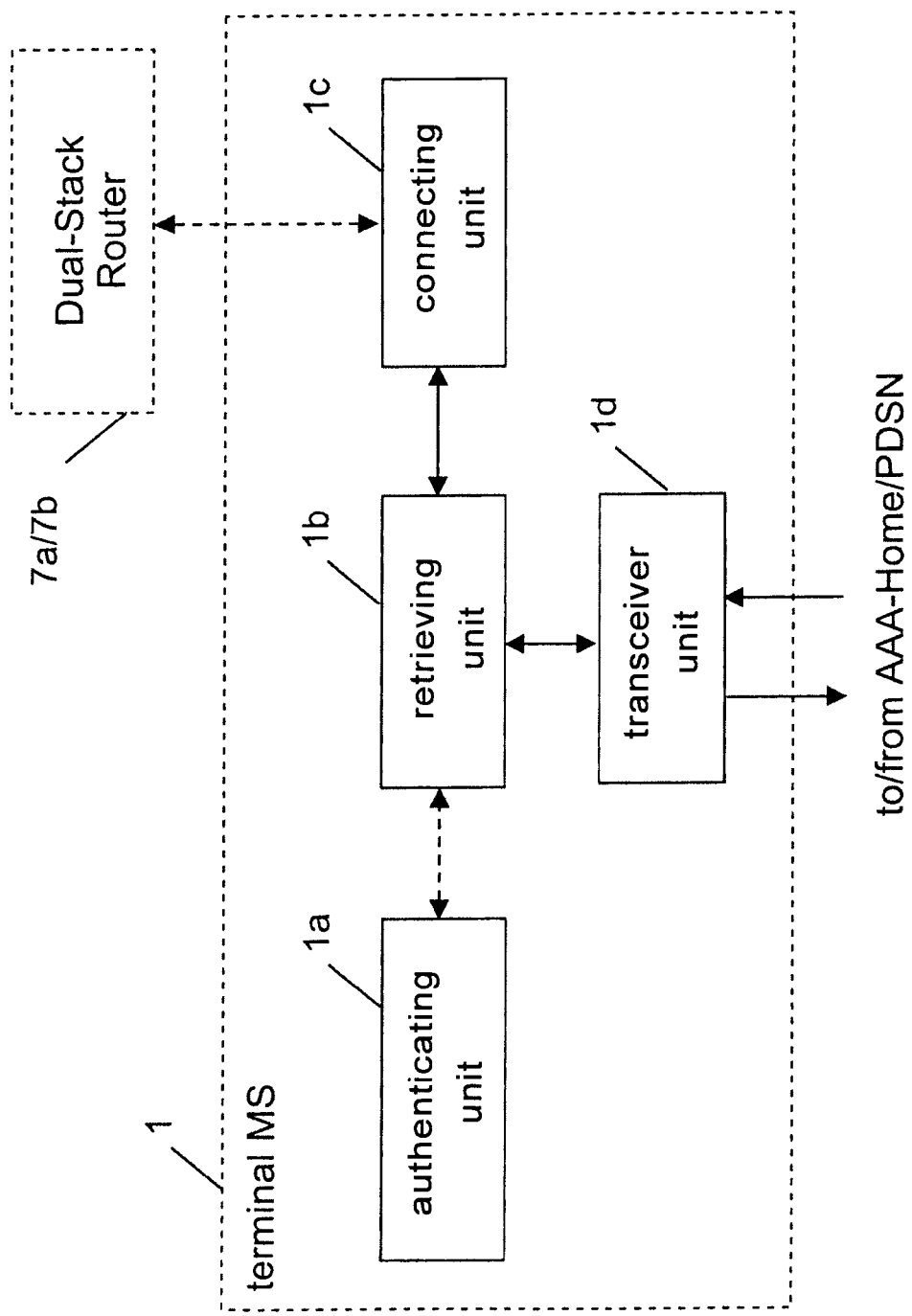
FIG. 3 depicts a block diagram of a terminal according to an embodiment of the present invention.
Figure 4:
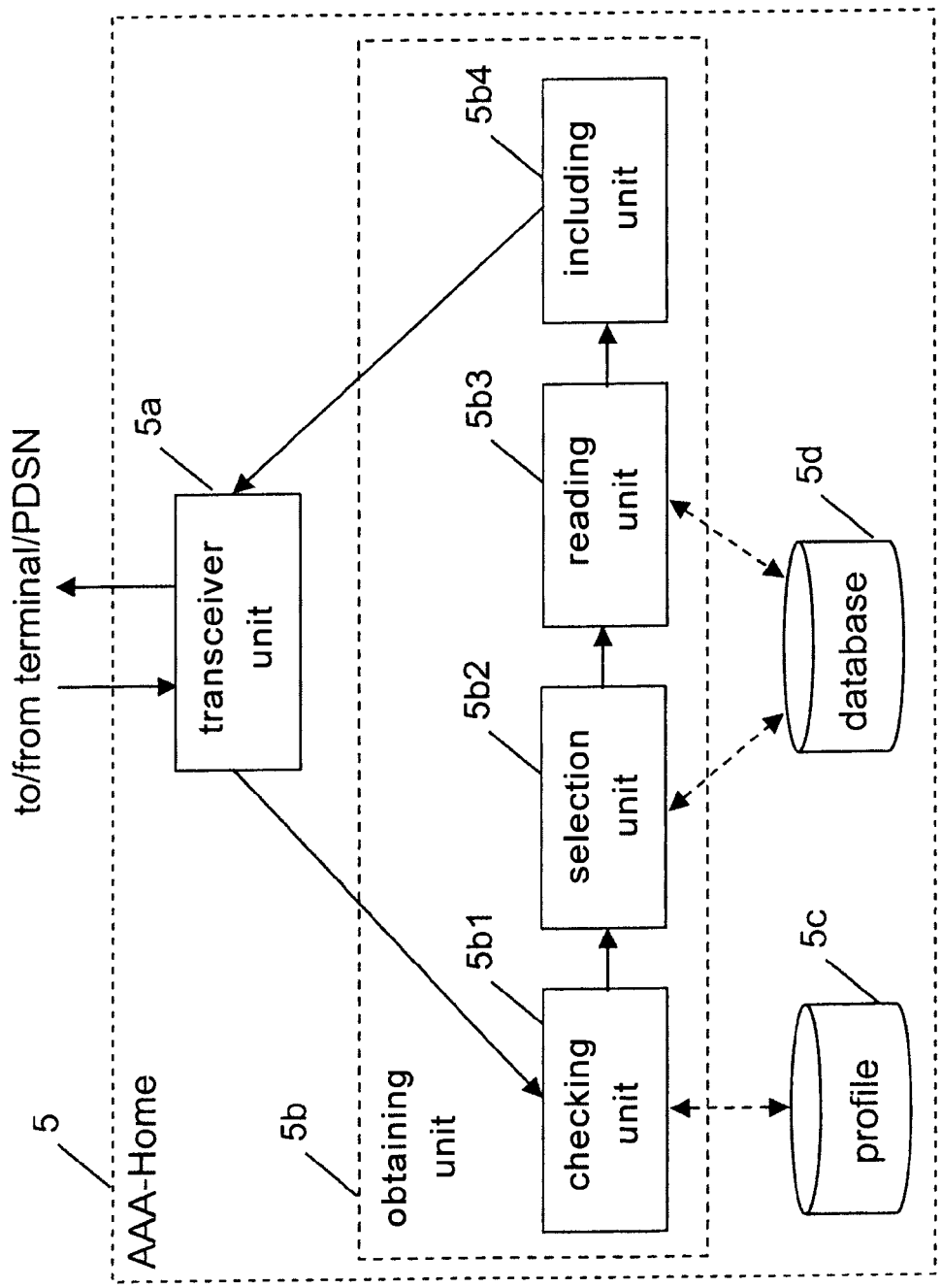
FIG. 4 depicts a block diagram of a backend network entity according to an embodiment of the present invention.

For explaining the configuration of constituents of a system according to the present invention reference is made to FIGS. 3 and 4.

FIG. 3 depicts a block diagram of a terminal according to an embodiment of the present invention.

A terminal according to the present solution is e.g. a mobile station according to the cdma2000 standards. It is operable in accordance with at least one communication protocol used in the communication system to which it is connectable. In the present example, the terminal is an IPv4/v6 dual-stack mobile station.

The terminal 1 according to the present invention is configured to discover a network element such as an interworking router in a communication system, wherein the terminal is connectable to a first part of the communication system such as an access network 3. The terminal comprises retrieving means 1b configured for retrieving a network address of the network element from a backend network entity of the communication system, e.g. an AAA server 5.

It is a facet of the terminal according to the present invention that the retrieving means are configured to perform the retrieving based on a subscription profile of the terminal and/or on a database at the backend network entity, which database comprises network addresses of network elements of the communication system.

According to an embodiment of the present invention, the retrieving means 1b are configured to operate in accordance with authenticating means 1a configured for authenticating of the terminal at the first part of the communications system by means of the backend network entity 5. In FIG. 3, this is illustrated by a double-headed broken arrow between the respective blocks. Further, the terminal comprises connecting means 1c configured for establishing a connection between the terminal 1 and the network element 7a/7b, e.g. the dual-stack router, by means of the retrieved network address of the router. For exchange of information, e.g. the retrieved network address, the retrieving means 1b and the connecting means 1c are able to communicate with each other. Additionally, the terminal 1 comprises transceiver means 1d configured for communicating with a service node PDSN 4 or an AAA server 5 (see FIGS. 1 and 2). Particularly, the transceiver means 1d are configured for sending a request from the terminal 1 to a service node PDSN 4 in the first part of the communication system and for receiving a response from the service node PDSN 4. In the example described above, the request comprises a request for authentication of the terminal at a second part of the communication system and credentials of the terminal, and the response comprises the network address of the network element.

According to an embodiment, the retrieving means 1b are configured to perform the retrieving of the network address as a part of a setup procedure according to a Point-to-Point-Protocol as is described in connection with FIG. 2.

FIG. 4 depicts a block diagram of a backend network entity 5 according to an embodiment of the present invention. In FIG. 4, the backend network entity 5 is represented by the AAA server AAA-Home of FIG. 2.

A backend network entity 5 according to the present invention is configured to discover a network element in a communication system, wherein a terminal 1 is connectable to a first part of the communication system. It comprises obtaining means 5b configured for obtaining a network address of the network element.

It is a facet of the present invention that the obtaining means are configured to perform the retrieving based on a subscription profile of the terminal and/or on a database at the backend network entity, which database comprises network addresses of network elements of the communication system.

The obtaining means 5b comprise checking means 5b1 configured for checking a request from the terminal 1 by verifying the credentials of the terminal 1 with the subscription profile 5c of the terminal, which subscription profile is referred to as profile in FIG. 4. According to the present embodiment, the request to be checked comprises a request for authentication of the terminal at a second part of the communications system and credentials of the terminal. The obtaining means 5b further comprise reading means 5b3 configured for reading the network address of the network element from a network address database 5d, if authentication for the second part of the communication system is approved, as well as including means 5b4 configured for including the read network address in a message for the terminal 1.

As can be seen in FIG. 4, the backend network entity 5 according to an embodiment of the present invention further comprises selection means 5b2 configured for selecting one of a plurality of network elements 7a, 7b as the network element, whose network address is to be obtained, based on predetermined selection criteria. For this purpose, the selection means 5b2 is able to access the database 5d of the backend network entity 5, which database contains all of the possible dual-stack routers 7a, 7b that are available for connecting to the second part of the communication system, i.e. to the IMSv6 8.

The backend network entity 5 further comprises transceiver means 5a configured for receiving a request from the terminal 1 or an intermediate service node PDSN 4 and for forwarding the obtained network address to the terminal 1 or to an intermediate service node PDSN 4 in the form of the message built up by the including means 5b4.

According to an embodiment, the obtaining means 5b are configured to perform the obtaining of the network address as a part of a setup procedure of the terminal 1 according to a Point-to-Point-Protocol as is described in connection with FIG. 2.

It is to be noted that the mentioned functional elements, i.e. the terminal 1 and the backend network entity 5 according to the present invention and their constituents can be implemented by any known means, either in hardware and/or software, respectively, if they are only configured to perform the described functions of the respective parts. For example, the retrieving means of a terminal can be implemented by any data processing unit, e.g. a microprocessor, being configured to operate according to the functions described above. The mentioned parts can also be realized in individual functional blocks or by individual means, or one or more of the mentioned parts can be realized in a single functional block or by a single means.

The present solution has another advantage from an equipment manufacturer's point of view, who is operating in many different countries preferring different technological concepts for 3G networks. The manufacturer can save costs and further development efforts by being able to deploy the IP Multimedia Subsystem IMSv6 developed for use in UMTS networks also in cdma2000 networks.

Summarizing, in order to enable IPv6 connectivity over an IPv4 network the terminal in cmda2000 networks needs to discover the tunnel-end-point address of a dual-stack (IPv4/v6) interworking router. Discovery of the dual-stack (DS) router to enable IPv6 connectivity to the IMS is a concrete problem that is addressed by the present invention. The proposed solution of the present invention utilizes AAA signaling to inform the terminal of the dual-stack router, i.e. to provide the terminal with the network (IP) address of the dual-stack router.

According to the present invention, there is disclosed a method, terminal, backend network entity, and system for discovering a network element in a communication system for a terminal, wherein the terminal is establishing a connection to a first part of the communication system, the discovering of the network element comprising a step of retrieving a network address of the network element from a backend network entity of the communication system, wherein the step of retrieving constitutes a part of an authentication of the terminal at the first part of the communication system by means of the backend network entity. Further, the retrieving can be based on a subscription profile of the terminal and/or a database at the backend network entity.

Even though the invention is described above with reference to the examples according to the accompanying drawings, it is clear that the invention is not restricted thereto. Rather, it is apparent to those skilled in the art that the present invention can be modified in many ways without departing from the scope of the inventive idea as disclosed in the appended claims.

We claim:

1. A method, comprising:
    discovering a network element in a communication system for a terminal, wherein the network element provides a gateway and interworking functionality between a first part and a second part of the communication system, which parts operate in accordance with different communication protocols, and wherein the first part of the communication system comprises an access network and an authentication server, the discovering of the network element comprising
    retrieving a network address of the network element from the authentication server wherein the retrieving constitutes a part of an authentication of the terminal at the first part of the communication system by the authentication server,
    wherein the second part of the communication system comprises an internet protocol multimedia subsystem, and
    wherein the network element comprises a double-stack router.

2. The method according to claim 1, wherein the retrieving of the network address is based on a subscription profile of the terminal.

3. The method according to claim 1, wherein the retrieving of the network address is based on a database at the authentication server, wherein the database comprises network addresses of network elements of the communication system.

4. The method according to claim 1, further comprising establishing a connection between the terminal and the network element by utilizing the retrieved network address of the network element.

5. The method according to claim 1, wherein the retrieving further comprises:
    sending a request from the terminal to a service node in the first part of the communication system;
    forwarding of the request from the service node to the authentication server; and obtaining the network address of the network element at the authentication server, wherein the request comprises a request for authentication of the terminal at a
    second part of the communication system and credentials of the terminal.

6. The method according to claim 5, wherein the obtaining of the network address of the network element comprises:
    checking the request at the authentication server by verifying the credentials of the terminal with a subscription profile of the terminal;
    if authentication for the second part of the communication system is approved, reading the network address of the network element from a database; and
    including the network address read from the database in a response message for the service node.

7. The method according to claim 5, wherein the retrieving further comprises:
    forwarding the network address obtained from the authentication server to the service node; and
    sending a response from the service node to the terminal, wherein the response comprises the obtained network address of the network element.

8. The method according to claim 1, wherein the retrieving comprises;
    selecting, at the authentication server, one of a plurality of network elements as the network element, whose network address is to be retrieved, based on predetermined selection criteria.

9. The method according to claim 1, wherein the retrieving of the network address forms a part of a setup procedure according to a point-to-point protocol.

10. The method according to claim 1, wherein the retrieving comprises retrieving an internet protocol address of the network element.

11. An apparatus comprising:
    a retrieving unit configured to retrieve a network address of a network element from an authentication server, wherein the network element is configured to provide a gateway and interworking functionality between a first part and a second part of a communication system, which parts operate in accordance with different communication protocols, and wherein the first part of the communication system comprises an access network and the authentication server,
    wherein the apparatus is configured to discover the network element in the communication system, and wherein the apparatus is connectable to the first part of the communication system, and
    wherein the retrieving constitutes a part of an authentication of the terminal at the first part of the communication system by the authentication servers
    wherein the second part of the communication system comprises an internet protocol multimedia subsystem, and
    wherein the network element comprises a double-stack router.

12. The apparatus according to claim 11, wherein the retrieving unit is configured to perform the retrieving based on a subscription profile of the terminal.

13. The apparatus according to claim 11, wherein the retrieving unit is configured to perform the retrieving based on a database at the authentication server, wherein the database comprises network addresses of network elements of the communication system.

14. The apparatus according to claim 11, further comprising an establisher configured to establish a connection between the terminal and the network element by utilizing the retrieved network address of the network element.

15. The apparatus according to claim 11, further comprising a transceiver configured to send a request from the terminal to a service node in the first part of the communication system, and to receive a response message from the service node, wherein the request comprises a request for authentication of the terminal at a second part of the communication system and credentials of the terminal.

16. The apparatus according to claim 11, wherein the retrieving unit is configured to perform the retrieving of the network address as a part of a setup procedure according to a point-to-point protocol.

17. The apparatus according to claim 11, wherein the apparatus is configured to be operable in accordance with at least one communication protocol.

18. An apparatus comprising:
    an obtaining unit configured to obtain a network address of a network element, wherein the network element is configured to provide a gateway and interworking functionality between a first part and a second part of a communication system, which parts operate in accordance with different communication protocols, and wherein the first part of the communication system comprises an access network and the apparatus,
    wherein the apparatus is configured to discover the network element in the communication system for a terminal, wherein the terminal is connectable to the first part of the communication system, and wherein the obtaining constitutes a part of an authentication of the terminal at the first part of the communication system by the apparatus
wherein the second part of the communication system comprises an internet protocol multimedia subsystem, and
wherein the network element comprises a double-stack router.

19. The apparatus according to claim 18, wherein the obtaining unit is configured to perform the obtaining based on a subscription profile of the terminal.

20. The apparatus according to claim 18, wherein the obtaining unit is configured to perform the obtaining based on a database at the apparatus, wherein the database comprises network addresses of network elements of the communication system.

21. The apparatus according to claim 18, wherein the obtaining unit further comprises:
a checker configured to check a request from the terminal by verifying credentials of the terminal with a subscription profile of the terminal, wherein the request comprises
a request for authentication of the terminal at the second part of the communications system and credentials of the terminal;
a reader configured to read the network address of the network element from a database, if authentication for the second part of the communication system is approved; and
an including unit configured to include the network address read from the database in a response message for the terminal.

22. The apparatus according to claim 18, further comprising a transceiver configured to receive a request from the terminal or an intermediate service node and to forward the obtained network address to the terminal or to the intermediate service node, wherein the request comprises a request for authentication of the terminal at the second part of the communications system and credentials of the terminal.

23. The apparatus according to claim 18, further comprising a selector configured to select one of a plurality of network elements as the network element, whose network address is to be obtained, based on predetermined selection criteria.

24. The apparatus according to claim 18, wherein the obtaining unit is configured to perform the obtaining of the network address as a portion of a setup procedure of the terminal according to a point-to-point protocol.

25. The apparatus according to claim 18, comprising an authentication, authorization and accounting server configured to perform authentication, authorization and accounting functionality.

26. The apparatus according to claim 18, configured to be operable according to a remote access dial-in user service protocol.

27. A system comprising:
at least one terminal comprising a retrieving unit configured to retrieve a network address of a network element from an authentication server, wherein the network element is configured to provide a gateway and interworking functionality between a first part and a second part of a communication system, which parts operate in accordance with different communication protocols, and
wherein the first part of the communication system comprises an access network and the authentication server; and
at least one authentication server comprising an obtaining unit configured to obtain the network address of the network element,
wherein the terminal is connectable to the first part of the communication system, and
wherein the retrieving and the obtaining constitute a part of an authentication of the terminal at the first part of the communication system by the authentication server,
wherein the second part of the communication system comprises an internet protocol multimedia subsystem, and
wherein the network element comprises a double-stack router.

28. The system according to claim 27, wherein the communication system is based on a cdma2000 standard.

29. The system according to claim 27, wherein the first part of the communication system comprises an access network.

30. The system according to claim 27, wherein the network element is configured to provide a gateway from the first part to the second part of the communication system.

31. The system according to claim 27, wherein the second part of the communication system comprises a multimedia subsystem based on Internet protocol.

32. The system according to claim 27, wherein the first part and the second part of the communication system are operable in accordance with different communication protocols, and wherein the network element is configured to perform a conversion between the communication protocols of the individual parts.

33. The system according to claim 32, wherein the communication protocol of the first part comprises Internet Protocol version 4.

34. The system according to claim 32, wherein the communication protocol of the second part comprises Internet Protocol version 6.

35. The system according to claim 32, wherein the network element comprises an Internet Protocol version 4/version 6 interworking router.

36. The system according to claim 32, wherein the at least one terminal is configured to be operable in accordance with both Internet Protocol version 4 and Internet Protocol version 6.

37. An apparatus comprising:
retrieving means for retrieving a network address of a network element from an authentication server, wherein the network element provides a gateway and interworking functionality between a first part and a second part of a communication system, which parts operate in accordance with different communication protocols, and wherein the first part of the communication system comprises an access network and the authentication server,
wherein the apparatus is for discovering the network element in the communication system, and wherein the apparatus is connectable to the first part of the communication system, and
wherein the retrieving constitutes a part of an authentication of a terminal at the first part of the communication system by the authentication server,
wherein the second part of the communication system comprises an internet protocol multimedia subsystem, and
wherein the network element comprises a double-stack router.

38. An apparatus comprising:
obtaining means for obtaining a network address of a network element, wherein the network element provides a gateway and interworking functionality between a first part and a second part of a communication system, which parts operate in accordance with different communication protocols, and wherein the first part of the communication system comprises an access network and the apparatus, wherein the apparatus is for discovering the network element in the communication system for a terminal, wherein the terminal is connectable to the first part of the communication system and wherein the obtaining constitutes a part of an authentication of the terminal at the first part of the communication system by the apparatus, wherein the second part of the communication system comprises an internet protocol multimedia subsystem, and wherein the network element comprises a double-stack router.

39. A computer program, embodied on a computer-readable medium, the computer program configured to control a processor to perform a method comprising:

discovering a network element in a communication system for a terminal, wherein the network element provides a gateway and interworking functionality between a first part and a second part of the communication system, which parts operate in accordance with different communication protocols, and wherein the first part of the communication system comprises an access network and an authentication server, the discovering of the network element comprising retrieving a network address of the network element from the authentication server, wherein the retrieving constitutes a part of an authentication of the terminal at the first part of the communication system by the authentication server, wherein the second part of the communication system comprises an internet protocol multimedia subsystem, and wherein the network element comprises a double-stack router.

* * * * *